(12) United States Patent
Motoyama et al.

(10) Patent No.: US 7,491,651 B2
(45) Date of Patent: *Feb. 17, 2009

(54) METHOD OF FORMING THICK SILICA-BASED FILM

(75) Inventors: Kenichi Motoyama, Chiba (JP);
Takakazu Nakada, Tokyo (JP); Hitoshi Furusho, Tokyo (JP); Hiroyoshi Fukuro, Chiba (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 75 days.

This patent is subject to a terminal disclaimer.

(21) Appl. No.: 11/409,086

(22) Filed: Apr. 24, 2006

(65) Prior Publication Data

US 2006/0189163 A1 Aug. 24, 2006

Related U.S. Application Data

(63) Continuation of application No. 10/474,514, filed as application No. PCT/JP02/03957 on Apr. 19, 2002, now Pat. No. 7,211,522.

(30) Foreign Application Priority Data

Apr. 24, 2001 (JP) .............................. 2001-125339

(51) Int. Cl.
*H01L 21/31* (2006.01)
(52) U.S. Cl. ..................... 438/763; 438/778; 438/780; 428/447; 428/451; 257/E21.024
(58) Field of Classification Search ................ 438/763, 438/778, 447, 451, 429, 780; 428/447, 451, 428/429
See application file for complete search history.

(56) References Cited

U.S. PATENT DOCUMENTS

| | | | |
|---|---|---|---|
| 4,277,525 A | 7/1981 | Nakayama et al. | |
| 4,719,125 A | 1/1988 | Anello et al. | |
| 4,865,649 A | 9/1989 | Kashiwagi et al. | |
| 5,766,673 A | 6/1998 | Nogami et al. | |
| 5,800,926 A | 9/1998 | Nogami et al. | |
| 5,880,187 A * | 3/1999 | Kawazu et al. | 525/101 |
| 6,472,012 B2 * | 10/2002 | Nakada et al. | 427/58 |
| 6,548,426 B1 | 4/2003 | Suzuki et al. | |
| 7,211,522 B2 * | 5/2007 | Motoyama et al. | 438/763 |

FOREIGN PATENT DOCUMENTS

| | | |
|---|---|---|
| EP | 0 776 925 | 6/1997 |
| EP | 0 790 522 | 8/1997 |
| EP | 1 108 692 | 6/2001 |
| JP | 62-88327 | 4/1987 |
| JP | 63241076 | 10/1988 |
| JP | 3-126612 | 5/1991 |
| JP | 7-233271 | 9/1995 |
| JP | 8-27419 | 1/1996 |
| JP | 9-281502 | 10/1997 |
| JP | 11-5946 | 1/1999 |
| JP | 2000-344894 | 12/2000 |
| JP | 2001-77105 | 3/2001 |
| JP | 2001-308089 | 11/2001 |
| JP | 07-286136 | 10/2005 |
| KR | 10-0333570 | 11/2002 |

OTHER PUBLICATIONS

U.S. Appl. No. 10/583,557, filed Jun. 19, 2006, Motoyama et al.
U.S. Appl. No. 10/583,559, filed Jun. 19, 2006, Tani et al.
U.S. Appl. No. 11/409,086, filed Apr. 24, 2006, Motoyama et al.
U.S. Appl. No. 11/449,638, filed Jun. 9, 2006, Tani et al.

* cited by examiner

*Primary Examiner*—Hsien-ming Lee
(74) *Attorney, Agent, or Firm*—Oblon, Spivak, McClelland, Maier & Neustadt, P.C.

(57) ABSTRACT

A silica-based coating film on a substrate surface is prepared by forming a reaction mixture comprising a tetraalkoxysilicon compound (A) and/or an alkyl/alkoxy silane compound (B), an alcohol (C), and oxalic acid (D), in such ratios that the amount of alcohol (C) ranges from 0.5 to 100 mols per mol of all alkoxy groups present in the silicon compounds (A) and (B), and the amount of oxalic acid (D) ranges from 0.2 to 2 mols per mol of all alkoxy groups in the silicon compounds (A) and (B), and while maintaining the mixture at a $SiO_2$ concentration ranging from 0.5 to 11%, as calculated from silicon atoms in the mixture, by means of the alcohol (C); heating the reaction mixture at a temperature ranging from 50 to 180° C. until the total remaining amount of the silicon compounds (A) and (B) in the reaction mixture is not more than 5 mol %, to form a solution of a polysiloxane having a number average molecular weight, calculated on the basis of a polystyrene standard, ranging from 2,000 to 15,000; applying a coating fluid containing the solution of the polysiloxane onto a substrate surface; and thermally curing a coating film obtained by the application, at a temperature ranging from 80 to 600° C.

12 Claims, No Drawings

METHOD OF FORMING THICK SILICA-BASED FILM

TECHNICAL FIELD

The present invention relates to a process for forming a silica-based coating film, whereby a thick film can be formed. More particularly, the present invention relates to a process for forming a thick film suitable for application to electronic materials such as a planarization film, an interlayer insulation film, a protective film, a passivation film, etc., by using a silica-based coating material capable of forming a thick film. And, it relates to such a silica-based coating material and a process for its production.

BACKGROUND ART

Heretofore, a silica-based coating material has been used in various fields. For example, in a semiconductor device, it has been used as an insulation film between a semiconductor substrate and a metal wiring layer such as an aluminum wiring layer, or between metal wirings. Further, it has been used as a PN junction semiconductor formed on a semiconductor substrate, or as a protective film for various elements such as a capacitor element, a resistor element, etc.

Further, when a metal wiring layer or the like is formed on a semiconductor substrate, irregularities are formed by the metal wiring layer or the like on the semiconductor substrate. If it is attempted to form a metal wiring layer or the like on such an irregular surface, breaking of wire is likely to result due to the difference in level of the irregularities. By forming a silica-based insulation film as mentioned above, on such an irregular surface formed by a metal wiring layer and various elements, a role of planarization is also performed.

With respect to the silica-based coating film used in the above-mentioned fields, it is common to form the silica-based coating film by a vapor phase growing method such as a CVD method or a sputtering method, or a coating method for forming the silica-based coating film by means of a coating composition for forming a silica-based coating film.

As a coating fluid to form such a silica-based coating film, a siloxane polymer has been used. A polyalkylsilsesquioxane precursor as one of precursors of such a siloxane polymer, is disclosed, for example, in JP-A-63-241076 or JP-A-3-126612. However, the conventional method is a method wherein an alkylalkoxysilane is hydrolyzed to form an alkyl-siloxane polymer. In such a method, it is not easy to control the hydrolysis or the reaction for polycondensation. Further, if such a solution is highly concentrated to such an extent that a thick film can be formed by a single coating operation, the storage stability tends to be poor. Accordingly, in order to form a thick film, it has been common to carry out coating a few times for overcoating.

Further, a method wherein a polysilazane is thermally treated and used as a silicon oxynitride film (JP-A-62-88327), or a method wherein a polysilazane is thermally treated in a steam atmosphere and used as converted to a silicon oxide film. In such methods wherein a polysilazane is employed, it is possible to form a thick film by a single coating operation, but there is a problem such that ammonia or an amine will be generated during the thermal treatment and will contaminate the wiring material, etc.

DISCLOSURE OF THE INVENTION

The present invention is intended to provide a process for simply and efficiently forming a silica-based coating film having a film thickness of from 0.5 to 5 μm on various substrates, such a coating film, a stable coating fluid as an industrial product to be used for such a silica-based coating film, and a process for efficiently producing such a coating fluid.

In the present invention, a silica-based coating film of from 0.5 to 5 μm can be formed on a substrate surface by forming a reaction mixture comprising a silicon compound (A) represented by the formula (1):

$$Si(OR)_4 \quad (1)$$

(wherein R is an alkyl group having from 1 to 5 carbon atoms) and/or a silicon compound (B) represented by the formula (2):

$$R^1{}_n Si(OR^2)_{4-n} \quad (2)$$

(wherein $R^1$ is an unsubstituted or substituted alkyl group having from 1 to 5 carbon atoms, an alkenyl group or an aryl group, $R^2$ is an alkyl group having from 1 to 5 carbon atoms, and n is an integer of from 1 to 3), an alcohol (C) represented by the formula (3):

$$R^3CH_2OH \quad (3)$$

(wherein $R^3$ is a hydrogen atom, or an unsubstituted or substituted alkyl group having from 1 to 12 carbon atoms), and oxalic acid (D), in such ratios that the alcohol (C) is from 0.5 to 100 mols per mol of all alkoxy groups contained in the silicon compounds (A) and (B), and the oxalic acid (D) is from 0.2 to 2 mols per mol of all alkoxy groups in the silicon compounds (A) and (B), and while maintaining the mixture at a $SiO_2$ concentration of from 0.5 to 11% as calculated from silicon atoms in the mixture, by means of the alcohol (C), heating the reaction mixture at a temperature of from 50 to 180° C. until the total remaining amount of the silicon compounds (A) and (B) in the reaction mixture becomes to be not more than 5 mol %, to form a solution of a polysiloxane having a number average molecular weight, as calculated as polystyrene, of from 2,000 to 15,000 thereby formed, then applying a coating fluid containing the solution of the polysiloxane to a substrate surface, and thermally curing a coating film obtained by the application, at a temperature of from 80 to 600° C.

In the present invention, as a silicon compound, the silicon compound (A) and/or the silicon compound (B) is used. Here, the silicon compound (A) and/or the silicon compound (B) includes the following three modes. 1) The silicon compound (A), 2) the silicon compound (B), and 3) the silicon compound (A) and the silicon compound (B).

The solution of a polysiloxane of the present invention is transparent and contains no gelled polysiloxane. A large amount of the alcohol (C) and a relatively large amount of oxalic acid (D) are coexistent, but the silicon compound (A) and/or the silicon compound (B) is heated in the reaction mixture having no water added, and this polysiloxane is not one formed by condensation of a hydrolyzate of the silicon compound (A) and/or the silicon compound (B). In a case where a polysiloxane is formed from an alkoxy silane by a method of hydrolysis in an alcohol solvent, it is likely that the liquid tends to have turbidity or a non-uniform polysiloxane tends to form as the hydrolysis proceeds. However, with the reaction mixture by the present invention, no such phenomenon will take place.

Of the polysiloxane obtained by the present invention, the chemical structure is complex and can hardly be specified. However, it is considered that a polysiloxane having such a polymerization degree as to form a solution, is formed even if it has a branched structure, as the polymerization takes place by reacting the alcohol (C) to an intermediate formed by the reaction of the silicon compound (A) and/or the silicon compound (B) with oxalic acid (D).

The polysiloxane obtained by the present invention has a number average molecular weight, as calculated as polystyrene, of from 2,000 to 15,000, preferably from 2,000 to 8,000. If the molecular weight is smaller than 2,000, shrinkage of the film during the film formation tends to be large, and if the film thickness is increased beyond 0.5 μm, cracking will be likely. Further, if the molecular weight exceeds 15,000, the obtained polysiloxane tends to be of a high molecular weight, whereby a problem such as gelation or high viscosity of the polysiloxane solution is likely to result, and the storage stability tends to be poor.

By heating the coating film containing the above-mentioned polysiloxane solution coated on the substrate, the curing reaction of the polysiloxane in the coating film and removal of the volatile component from the coating film will proceed thereby to form an insoluble coating film excellent in transparency, which intimately adheres to the substrate surface and which is thick and excellent in the transparency and has a high cracking limit.

BEST MODE FOR CARRYING OUT THE INVENTION

Examples of the alkyl groups R and $R^2$ contained in the formulae (1) and (2) include methyl, ethyl, propyl, butyl and pentyl. Preferred examples of the silicon compound (A) include tetramethoxysilane, tetraethoxysilane, tetrapropoxysilane and tetrabutoxysilane. Among them, tetramethoxysilane or tetraethoxysilane is, for example, particularly preferred.

$R^1$ in the formula (2) may, for example, be methyl, ethyl, propyl, butyl, pentyl, phenyl or vinyl. Preferred examples of the silicon compound (B) include, in a case where n in the formula (2) is an integer of 1, methyltrimethoxysilane, ethyltrimethoxysilane, propyltriethoxysilane, butyltriethoxysilane, phenyltrimethoxysilane, vinyltrimethoxysilane, methyltriethoxysilane, ethyltriethoxysilane, propyltriethoxysilane, butyltriethoxysilane, phenyltriethoxysilane and vinyltriethoxysilane; in a case where n in the formula (2) is an integer of 2, dimethyldimethoxysilane, diethyldimethoxysilane, dipropyldimethoxysilane, dibutyldimethoxysilane, diphenyldimethoxysilane, divinyldimethoxysilane, dimethyldiethoxysilane, diethyldiethoxysilane, dipropyldiethoxysilane, dibutyldiethoxysilane, diphenyldiethoxysilane, and divinyldiethoxysilane; and in a case where n in the formula (2) is an integer of 3, trimethylmethoxysilane, triethylmethoxysilane, tripropylmethoxysilane, tributylmethoxysilane, triphenylmethoxysilane, trivinylmethoxysilane, trimethylethoxysilane, triethylethoxysilane, tripropylethoxysilane, tributylethoxysilane, triphenylethoxysilane, and trivinylethoxysilane.

Among these, in a case where the silicon compound (B) is used alone without combining it with the silicon compound (A), more preferred is methyltrimethoxysilane, ethyltrimethoxysilane, propyltrimethoxysilane, butyltrimethoxysilane, phenyltrimethoxysilane, vinyltrimethoxysilane, methyltriethoxysilane, ethyltriethoxysilane, propyltriethoxysilane, butyltriethoxysilane, phenyltriethoxysilane, or vinyltriethoxysilane, as exemplified in the case where n is an integer of 1 in the formula (2). Among them, particularly preferred is methyltriethoxysilane.

Further, in a case where the silicon compound (B) is used in combination with the silicon compound (A), methyltriethoxysilane, dimethyldiethoxysilane, ethyltriethoxysilane, diethyldiethoxysilane, γ-metacryloxypropyltrimethoxysilane, vinyltriethoxysilane, divinyldiethoxysilane and phenyltriethoxysilane are, for example, particularly preferred. Such silicon compounds (B) may be used alone or in combination of two or more of them.

Examples of the unsubstituted alkyl group $R^3$ contained in the formula (3) may be methyl, ethyl, propyl, butyl, pentyl, hexyl, heptyl and octyl, and examples of the substituted alkyl group $R^3$ include hydroxymethyl, methoxymethyl, ethoxymethyl, hydroxyethyl, methoxyethyl and ethoxyethyl. Preferred examples of the alcohol (C) include methanol, ethanol, propanol, n-butanol, ethylene glycol monomethyl ether, and ethylene glycol monoethyl ether. These may be used alone or in combination of two or more of them. Among them, particularly preferred is ethanol.

If oxalic acid (D) is used in an amount smaller than 0.2 mol per mol of all alkoxy groups contained in the silicon compounds (A) and (B), the molecular weight of the resulting polysiloxane tends to be low, and the hardness of the resulting film tends to be low. On the contrary, if the oxalic acid (D) is used in an amount larger than 2 mols per mol of all alkoxy groups contained in the silicon compounds (A) and (B), the resulting polysiloxane-containing solution contains a relatively large amount of oxalic acid (D), and from such a solution, a film having the intended performance can not be obtained. It is particularly preferred to use oxalic acid (D) in an amount of from 0.25 to 1 mol per mol of all alkoxy groups contained in the silicon compounds (A) and (B).

In the preparation of the polysiloxane solution, in addition to the silicon compound (A), the silicon compound (B), the alcohol (C) and the oxalic acid (D), an alkoxysilane which is not used in the above silicon compounds (A) and (B), may be incorporated as a modifier, as the case requires. Preferred examples of such a modifier include γ-aminopropyltrimethoxysilane, γ-aminopropyltriethoxysilane, γ-glycidoxypropyltrimethoxysilane, γ-glycidoxypropyltriethoxysilane, γ-methacryloxypropyltrimethoxysilane and γ-methacryloxypropyltriethoxysilane. These modifiers can lower the temperature for curing the coating film on the substrate and improve the adhesion of the film to the substrate.

The reaction mixture comprising the silicon compound (A) and/or the silicon compound (B), the alcohol (C) and the oxalic acid (D), can be formed by mixing them, or by further adding the above-mentioned modifier to them. To this reaction mixture, water may not be added. And, this reaction mixture is preferably heated as a reaction mixture in a liquid state. For example, it is preferred to heat it as a reaction mixture in a solution state obtained by preliminarily adding and dissolving the oxalic acid (D) in the alcohol (C) to obtain a solution and then mixing the silicon compound (A) and/or silicon compound (B), the above modifier, etc., or by heating it as a reaction mixture in a solution state obtained by mixing a solution having oxalic acid (D) preliminarily added and dissolved in the alcohol (C), into a mixture of the silicon compound (A) and/or silicon compound (B) and the above-mentioned modifier. Usually, the reaction mixture comprising the silicon compound (A), the silicon compound (B), the alcohol (C) and the oxalic acid (D) in the above-mentioned ratios, contains silicon atoms contained therein at a concentration of from 0.5 to 11 wt % as calculated as $SiO_2$. Also in a case where the above modifier is contained, such a modifier is contained so that the silicon atoms contained therein will have a concentration of from 0.5 to 11% as calculated as $SiO_2$. And, during the heating of such a reaction mixture, such a reaction mixture is maintained at the above-mentioned $SiO_2$ concentration, and absence of water is also maintained. This heating can be carried out at a liquid temperature of from 50 to 180° C. in a usual reactor. Preferably, it is carried out, for example, in a closed container or under reflux so that evaporation or dissipation of the liquid from the reactor will not take place.

If the heating to form the polysiloxane is carried out at a temperature lower than 50° C., a liquid having a turbidity or containing insoluble substances, is likely to be formed. Accordingly, this heating is carried out at a temperature higher than 50° C., and it can be completed in a short time as the temperature is high. However, heating at a temperature higher than 180° C. is not efficient as it brings about no additional merit. The heating time is not particularly limited, and for example, it is usually at a level of 8 hours at 50° C. or at a level of 3 hours under reflux at 78° C. Usually, with a polysiloxane-containing solution in which the silicon compound (A) and (B) remain more than 5 mol %, based on the total amount of these silicon compounds charged, if such a solution is coated on the substrate surface and then the coated film is thermally cured at a temperature of from 80 to 600° C., the obtained film is likely to have pinholes, or a film having a sufficient hardness can hardly be obtained.

The polysiloxane solution obtained by the above heating can be used by itself as a coating fluid for the next coating step. However, as the case requires, a liquid obtained by concentration or dilution may be used as a coating fluid, a liquid obtained by substituting other solvent may be used as a coating fluid, or a liquid obtained by incorporating a desired additive may be used as a coating fluid. As an example of such an additive, solid inorganic fine particles such as colloidal fine particles, a metal salt or a metal compound may be mentioned, and such an additive is preferred to control the hardness of the film, the adhesion to the substrate, the refractive index, etc. The coating fluid to be used for the coating step is preferably a liquid which contains silicon atoms derived from the transparent solution of the above-mentioned polysiloxane in an amount of from 0.5 to 18 wt % as calculated as $SiO_2$. If this $SiO_2$ concentration is smaller than 0.5 wt %, the thickness of film to be formed by one coating operation tends to be thin, and if this concentration exceeds 18 wt %, the storage stability of this solution tends to be inadequate. The $SiO_2$ concentration of this coating fluid is particularly preferably from 2 to 15%.

The above solution of the polysiloxane can be coated on a substrate by a usual method such as a dipping method, a spin coating method, a brush coating method, a roll coating method or a flexoprinting method. The coating on the substrate by the above solution of the polysiloxane is characterized in that a sufficiently thick film can be formed by a single coating operation, but if necessary, it may be coated in a plurality of times.

The coating film formed on the substrate may be thermally cured as it is. However, it may preliminarily be dried at a temperature of from room temperature to 80° C., preferably from 50 to 80° C. and then heated at a temperature of from 80 to 600° C., preferably from 80 to 400° C. The time for this heating may sufficiently be from about 5 to 60 minutes. If this heating is lower than 80° C., the hardness, chemical resistance, etc. of the resulting coating film tend to be inadequate. At a high temperature exceeding 600° C., elimination of organic groups is likely to take place, whereby the coating film is likely to have cracks, or the coating film is likely to be peeled, such being undesirable. Such heating can be carried out by a usual method, for example, by using a hot plate, an oven or a belt furnace.

The thickness of the film after curing is usually adjusted to be from 0.01 to 3.0 μm. The silica-based coating film obtainable by the present invention can be used as a relatively thick film of from 0.5 to 5 μm which is effective for the purpose of planarization to eliminate the difference in level of the primer.

Now, the present invention will be described specifically with reference to Examples and Comparative Examples, but it should be understood that the present invention is by no means restricted by such Examples.

Here, with respect to the molecular weight of the polysiloxane solution in each Example, the number average molecular weight, as calculated as polystyrene, was obtained in accordance with a GPC method by a high performance liquid chromatography. The measuring conditions are shown below.

Measuring Conditions by the GPC Method
    Eluent: THF
    Column: KF-804L, manufactured by Shodex Company
    Flow rate: 1 mL/min
    Standard substance: polystyrene (210000, 70600, 28600, 9860, 2960, 580)
    Detector: RI
    Sample concentration: 1 wt %

EXAMPLE 1

Into a four-necked reactor flask equipped with a reflux condenser, 61.2 g of ethanol was charged, and 18.0 g of oxalic acid was gradually added to this ethanol with stirring, to prepare an ethanol solution of oxalic acid. Then, into this solution, 20.8 g of tetraethoxysilane was dropwise added. After completion of the dropwise addition, this solution was heated to a reflux temperature, and heating was continued for 5 hours under reflux, followed by cooling to obtain a polysiloxane solution (L-1), having a solid content concentration of 6 wt %.

This solution was analyzed by gas chromatography, whereby no alkoxysilane monomer was detected. Further, the molecular weight of this solution was 2,800, as the number average molecular weight, as calculated as polystyrene.

EXAMPLE 2

Into a four-necked reactor flask equipped with a reflux condenser, 64.9 g of ethanol was charged, and 15.8 g of oxalic acid was gradually added to this ethanol with stirring, to prepare an ethanol solution of oxalic acid. Then, into this solution, a mixture comprising 10.4 g of tetraethoxysilane and 8.9 g of methyltriethoxysilane, was dropwise added. After completion of the dropwise addition, this solution was heated to its reflux temperature, and heating was continued for 5 hours under reflux, followed by cooling to obtain a polysiloxane solution (L-2), having a solid content concentration of 6 wt %.

This solution was analyzed by gas chromatography, whereby no alkoxysilane monomer was detected. Further, the molecular weight of this solution was 5,600, as the number average molecular weight, as calculated as polystyrene.

EXAMPLE 3

Into a four-necked reactor flask equipped with a reflux condenser, 50.7 g of ethanol was charged, and 21.6 g of oxalic acid was gradually added to this ethanol with stirring, to prepare an ethanol solution of oxalic acid. Then, into this solution, a mixture comprising 6.3 g of tetraethoxysilane and 21.4 g of methyltriethoxysilane, was dropwise added. After completion of the dropwise addition, this solution was heated to its reflux temperature, and heating was continued for 5 hours under reflux, followed by cooling to obtain a polysiloxane solution (L-3), having a solid content concentration of 9 wt %.

This solution was analyzed by gas chromatography, whereby no alkoxysilane monomer was detected. Further, the molecular weight of this solution was 6,000, as the number average molecular weight, as calculated as polystyrene.

EXAMPLE 4

Into a four-necked reactor flask equipped with a reflux condenser, 53.0 g of ethanol was charged, and 20.3 g of oxalic acid was gradually added to this ethanol with stirring, to prepare an ethanol solution of oxalic acid. Then, into this solution, 26.8 g of methyltriethoxysilane was dropwise added. After completion of the dropwise addition, this solution was heated to its reflux temperature, and heating was continued for 5 hours under reflux, followed by cooling to obtain a polysiloxane solution (L-4), having a solid content concentration of 9 wt %.

This solution was analyzed by gas chromatography, whereby no alkoxysilane monomer was detected. Further, the molecular weight of this solution was 6,200, as the number average molecular weight, as calculated as polystyrene.

EXAMPLE 5

Into a four-necked reactor flask equipped with a reflux condenser, 64.3 g of ethanol was charged, and 15.8 g of oxalic acid was gradually added to this ethanol with stirring, to prepare an ethanol solution of oxalic acid. Then, into this solution, a mixture comprising 10.4 g of tetraethoxysilane and 9.5 g of vinyltriethoxysilane, was dropwise added. After completion of the dropwise addition, this solution was heated to its reflux temperature, and heating was continued for 5 hours under reflux, followed by cooling to obtain a polysiloxane solution (L-5), having a solid content concentration of 9 wt %.

This solution was analyzed by gas chromatography, whereby no alkoxysilane monomer was detected. Further, the molecular weight of this solution was 4,300, as the number average molecular weight, as calculated as polystyrene.

EXAMPLE 6

Into a four-necked reactor flask equipped with a reflux condenser, 61.8 g of ethanol was charged, and 15.8 g of oxalic acid was gradually added to this ethanol with stirring, to prepare an ethanol solution of oxalic acid. Then, into, this solution, a mixture comprising 10.4 g of tetraethoxysilane and 12.0 g of phenyltriethoxysilane, was dropwise added. After completion of the dropwise addition, this solution was heated to its reflux temperature, and heating was continued for 5 hours under reflux, followed by cooling to obtain a polysiloxane solution (L-6), having a solid content concentration of 6 wt %.

This solution was analyzed by gas chromatography, whereby no alkoxysilane monomer was detected. Further, the molecular weight of this solution was 4,700, as the number average molecular weight, as calculated as polystyrene.

EXAMPLE 7

Into a four-necked reactor flask equipped with a reflux condenser, 62.3 g of ethanol was charged, and 17.3 g of oxalic acid was gradually added to this ethanol with stirring, to prepare an ethanol solution of oxalic acid. Then, into this solution, 19.8 g of tetraethoxysilane and 0.6 g of trimethylethoxysilane were dropwise added. After completion of the dropwise addition, this solution was heated to its reflux temperature, and heating was continued for 5 hours under reflux, followed by cooling to obtain a polysiloxane solution (L-21) having a solid content concentration of 6 wt %.

This solution was analyzed by gas chromatography, whereby no alkoxysilane monomer was detected. Further, the molecular weight of this solution was 3,100, as the number average molecular weight, as calculated as polystyrene.

EXAMPLE 8

Into a four-necked reactor flask equipped with a reflux condenser, 62.7 g of ethanol was charged, and 17.1 g of oxalic acid was gradually added to this ethanol with stirring, to prepare an ethanol solution of oxalic acid. Then, into this solution, 18.7 g of tetraethoxysilane and 1.5 g of dimethyldiethoxysilane were dropwise added. After completion of the dropwise addition, this solution was heated to its reflux temperature, and heating was continued for 5 hours under reflux, followed by cooling to obtain a polysiloxane solution (L-22) having a solid content concentration of 6 wt %.

This solution was analyzed by gas chromatography, whereby no alkoxysilane monomer was detected. Further, the molecular weight of this solution was 3,800, as the number average molecular weight, as calculated as polystyrene.

COMPARATIVE EXAMPLE 1

Into a four-necked reactor flask equipped with a reflux condenser, 71.9 g of ethanol and 20.8 g of tetraethoxysilane were added and uniformly mixed. Then, to this solution, 7.2 g of water and, as a catalyst, 0.1 g of concentrated nitric acid (60 wt % nitric acid) were added, and stirring was continued for 30 minutes, to obtain a polysiloxane solution (L-7) having a solid content concentration of 6 wt %.

COMPARATIVE EXAMPLE 2

Into a four-necked reactor flask equipped with a reflux condenser, 74.3 g of ethanol, 10.4 g of tetraethoxysilane and 8.9 g of methyltriethoxysilane, were added and uniformly mixed. Then, to this solution, 6.3 g of water and, as a catalyst, 0.1 g of concentrated nitric acid (60 wt % nitric acid) were added, and stirring was continued for 30 minutes, to obtain a polysiloxane solution (L-8) having a solid content concentration of 6 wt %.

COMPARATIVE EXAMPLE 3

Into a four-necked reactor flask equipped with a reflux condenser, 66.4 g of ethanol, 6.3 g of tetraethoxysilane and 21.4 g of methyltriethoxysilane, were added and uniformly mixed. Then, to this solution, 5.8 g of water and, as a catalyst, 0.1 g of concentrated nitric acid (60 wt % nitric acid) were added, and stirring was continued for 30 minutes, to obtain a polysiloxane solution (L-9) having a solid content concentration of 9 wt %.

COMPARATIVE EXAMPLE 4

Into a four-necked reactor flask equipped with a reflux condenser, 67.7 g of ethanol and 26.8 g of methyltriethoxysilane were added and uniformly mixed. Then, to this solution, 5.4 g of water and, as a catalyst, 0.1 g of concentrated nitric acid (60 wt % nitric acid) were added, and stirring was continued for 30 minutes, to obtain a polysiloxane solution (L-10) having a solid content concentration of 9 wt %.

COMPARATIVE EXAMPLE 5

Into a four-necked reactor flask equipped with a reflux condenser, 73.7 g of ethanol, 10.4 g of tetraethoxysilane and 9.5 g of vinyltriethoxysilane, were added and uniformly mixed. Then, to this solution, 6.3 g of water and, as a catalyst, 0.1 g of concentrated nitric acid (60 wt % nitric acid) were added, and stirring was continued for 30 minutes, to obtain a polysiloxane solution (L-11) having a solid content concentration of 6 wt %.

COMPARATIVE EXAMPLE 6

Into a four-necked reactor flask equipped with a reflux condenser, 71.2 g of ethanol, 10.4 g of tetraethoxysilane and 12.0 g of phenyltriethoxysilane, were added and uniformly mixed. Then, to this solution, 6.3 g of water and, as a catalyst, 0.1 g of concentrated nitric acid (60 wt % nitric acid) were added, and stirring was continued for 30 minutes, to obtain a polysiloxane solution (L-12) having a solid content concentration of 6 wt %.

COMPARATIVE EXAMPLE 7

Into a four-necked reactor flask equipped with a reflux condenser, 57.9 g of ethanol was charged, and 18.0 g of oxalic acid was gradually added to this ethanol with stirring, to prepare an ethanol solution of oxalic acid. Then, into this solution, a mixture comprising 4.2 g of tetraethoxysilane and 19.9 g of hexyltriethoxysilane, was dropwise added. After completion of the dropwise addition, this solution was heated to its reflux temperature, and heating was continued for 5 hours under reflux, followed by cooling, to obtain a polysiloxane solution (L-13) having a solid content concentration of 6 wt %.

This solution was analyzed by gas chromatography, whereby no alkoxysilane monomer was detected. Further, the molecular weight of this solution was 1,800, as the number average molecular weight, as calculated as polystyrene.

EVALUATION EXAMPLE 1

The polysiloxane solutions (L-1) to (L-13) and (L-21) to (L-22) were left to stand over three months at 23° C. as closed in glass containers. During the period, the presence or absence of turbidity or precipitation formed in the containers was observed, whereby the results as shown in Table 1 were obtained. In the same Table, symbol ○ indicates that no change was observed upon expiration of three months as being left to stand as mentioned above, symbol Δ indicates that turbidity formed upon expiration of one month as being left to stand as mentioned above, and symbol X indicates that turbidity formed within two weeks as being left to stand as mentioned above. In the same Table, (L-1) to (L-7), (L-13) and (L-21) to (L-22) showed good stability, while (L-9) underwent gelation after 10 days, and (L-10) showed turbidity at the time of preparation of the solution. Further, (L-11) showed turbidity after 10 days, and (L-12) showed white precipitates after 5 days.

Thus, the results in Table 1 showed that the polysiloxane solutions of Examples had good stability as compared with the polysiloxane solutions prepared by a hydrolytic method.

EVALUATION EXAMPLE 2

On silicon substrates, the polysiloxane solutions of (L-1) to (L-8), (L-13) and (L-21) to (L-22) were coated by a spin coater and then dried at 80° C. to form coating films on the silicon substrates, whereupon the coating film surfaces were observed to test the film-forming properties of these solutions. The results are shown in Table 1. In the same Table, symbol ○ indicates that the film was a uniform coating film, symbol Δ indicates that pinholes were partially observed in the coating film, and symbol X indicates that cissing was observed in the coating film.

The results of Table 1 indicate that the polysiloxane solutions (L-1) to (L-8), (L-13) and (L-21) to (L-22) showed good film-forming properties, while with the polysiloxane solutions (L-9) to (L-12), the film-forming properties were insufficient.

TABLE 1

| Solution | Stability | Film forming property |
|---|---|---|
| L-1 | ○ | ○ |
| L-2 | ○ | ○ |
| L-3 | ○ | ○ |
| L-4 | ○ | ○ |
| L-5 | ○ | ○ |
| L-6 | ○ | ○ |
| L-7*) | ○ | ○ |
| L-8*) | Δ | ○ |
| L-9*) | X | Δ |
| L-10*) | X | X |
| L-11*) | X | Δ |
| L-12*) | X | X |
| L-13*) | ○ | ○ |
| L-21 | ○ | ○ |
| L-22 | ○ | ○ |

*)Comparative Example

EVALUATION EXAMPLE 3

The polysiloxane solutions (L-1) to (L-8), (L-13) and (L-21) to (L-22) which showed good film-forming properties in Evaluation Example 1, were, respectively, spin-coated on substrates to form coating films, and then, these coating films were dried at 80° C. for 5 minutes on a hot plate and then heated at 300° C. in a calcination furnace, to form coating films on the substrate surfaces. Then, with respect to the obtained coating films, the pencil hardness, the maximum film thicknesses of the coating films obtained by a single coating operation, and the transmittance, were measured by the following methods.

Pencil hardness: in accordance with the method prescribed in JIS K5400.

Maximum film thickness: the above-mentioned polysiloxane solution was concentrated by a rotary evaporator so that the solid content concentration would be from 10 to 15 wt %, to obtain a coating fluid. The maximum film thickness where no cracking resulted on a substrate, was measured. The film thickness was measured in such a manner that a cutting mark was imparted by a cutter to the coating film after drying, followed by thermal curing, and with respect to the obtained coating film, the difference in level was measured by means of a Tallis step manufactured by Rank Taylor Hobson Company.

Transmittance: A coating film having a film thickness of 0.3 μm, was formed on a quartz substrate by using the above-mentioned polysiloxane solution, and the transmittance within a wavelength range of from 800 to 200 nm was measured by means of a spectrophotometer UV3100PC, manufactured by Shimadzu Corporation.

The results of these measurements are shown in Table 2.

The maximum film thickness of the coating fluid (L-7) obtained by the hydrolytic method of Comparative Example 1 was 0.3 μm, while the maximum film thickness of the coating fluid (L-1) obtained in Example 1 was 0.8 μm. The maximum film thicknesses of the coating fluids (L-21) and (L-22) obtained in Examples 7 and 8, were 1.2 and 1.6 μm, respectively. Further, with the coating fluids (L-2) to (L-6) obtained in Examples 2 to 6, coating films having a film thickness of two or more μm, free from cracks and having high transparency, high hardness and good flatness, were obtained. Further, with the coating fluid (L-13) having a number average molecular weight of 1,800, obtained in Comparative Example 7, the maximum film thickness was 0.4 μm, although the transparency and flatness were good.

The transmittances of the polysiloxane solutions obtained in Examples 1 to 6 and Examples 7 and 8, were all at least 90%, and the obtained coating films were found to have excellent transparency.

TABLE 2

| Solution | Pencil hardness | Maximum film thickness (μm) | Transmittance |
|---|---|---|---|
| L-1 | 8H | 0.8 | At least 90% |
| L-2 | 7H | 2.4 | At least 90% |
| L-3 | 7H | >3.0 | At least 90% |
| L-4 | 7H | >3.0 | At least 90% |
| L-5 | 8H | 2.5 | At least 90% |
| L-6 | 7H | 2.5 | At least 90% |
| L-7*) | 7H | 0.3 | At least 90% |
| L-8*) | 6H | 0.8 | At least 90% |
| L-13*) | 4H | 0.4 | At least 90% |
| L-21 | 8H | 1.2 | At least 90% |
| L-22 | 7H | 1.6 | At least 90% |

*)Comparative Example

INDUSTRIAL APPLICABILITY

According to the present invention, a coating fluid can efficiently be prepared simply by mixing the starting material and carrying out heat treatment only once, and this coating fluid has a stability such that it is durable in storage at least three months, with a preferred one, at least 6 months, at room temperature, and thus, it can be presented as an industrial product.

According to the present invention, a thick film can be formed by a single coating operation, and it is possible to provide a silica-based coating film which has a high cracking limit and which is excellent in transparency and has sufficient hardness. It can suitably be employed as a planarization film, or an interlayer insulation film or a protective film in e.g. a semiconductor device or a liquid crystal display device.

The invention claimed is:

1. A process for forming a silica-based coating film on a substrate surface, comprising:

forming a reaction mixture comprising a silicon compound (A) having formula (1):

$$Si(OR)_4 \qquad (1)$$

wherein R is an alkyl group having from 1 to 5 carbon atoms, and/or a silicon compound (B) having formula (2):

$$R^1{}_n Si(OR^2)_{4-n} \qquad (2)$$

wherein $R_1$ is an unsubstituted or substituted alkyl group having from 1 to 5 carbon atoms, an alkenyl group or an aryl group, $R^2$ is an alkyl group having from 1 to 5 carbon atoms, and n is an integer of 2 to 3, an alcohol (C) having formula (3):

$$R^3CH_2OH \qquad (3)$$

wherein $R^3$ is a hydrogen atom, or an unsubstituted or substituted alkyl group having from 1 to 12 carbon atoms, and oxalic acid (D), in such ratios that the amount of alcohol (C) ranges from 0.5 to 100 mols per mol of all alkoxy groups present in the silicon compounds (A) and (B), and the amount of oxalic acid (D) ranges from 0.2 to 2 mols per mol of all alkoxy groups in the silicon compounds (A) and (B), and while maintaining the mixture at a $SiO_2$ concentration ranging from 0.5 to 11%, as calculated from silicon atoms in the mixture, by means of the alcohol (C);

heating the reaction mixture at a temperature ranging from 50 to 180° C. until the total remaining amount of the silicon compounds (A) and (B) in the reaction mixture is not more than 5 mol %, to form a solution of a polysiloxane having a number average molecular weight, calculated on the basis of a polystyrene standard, ranging from 2,000 to 15,000;

applying a coating fluid containing the solution of the polysiloxane onto a substrate surface; and thermally curing a coating film obtained by the application, at a temperature ranging from 80 to 600° C.

2. The process according to claim 1, wherein silicon compound (A) is tetramethoxysilane, tetraethoxysilane, tetrapropoxysilane or tetrabutoxysilane.

3. The process according to claim 1, wherein, in the case where n in formula (2) is 2, silicon compound (B) is dimethyldimethoxysilane, diethyldimethoxysilane, dipropyldimethoxysilane, dibuthyldimethoxysilane, diphenyldimethoxysilane, divinyldimethoxysilane, dimethyldiethoxysilane, diethyldiethoxysilane, dipropyldiethoxysilane, dibutyldiethoxysilane, diphenyldiethoxysilane or divinyldiethoxysilane; and in the case where n in formula (2) is 3, silicon compound (B) is trimethylmethoxysilane, triethylmethoxysilane, tripropylmethoxysilane, tributylmethoxysilane, triphenylmethoxysilane, trivinylmethoxysilane, trimethylethoxysilane, triethylethoxysilane, tripropylethoxysilane, tributylethoxysilane, triphenylethoxysilane or trivinylethoxysilane.

4. The process according to claim 1, wherein the polysiloxane has a number average molecular weight ranging from 2,000 to 8,000.

5. A coating fluid, comprising:

a solution of a polysiloxane having a number average molecular weight, calculated on the basis of a polystyrene standard, ranging from 2,000 to 15,000, that is prepared by forming a reaction mixture comprising a silicon compound (A) having formula (1):

$$Si(OR)_4 \qquad (1)$$

wherein R is an alkyl group having from 1 to 5 carbon atoms, and/or a silicon compound (B) having formula (2):

$$R^1{}_n Si(OR^2)_{4-n} \qquad (2)$$

wherein $R^1$ is an unsubstituted or substituted alkyl group having from 1 to 5 carbon atoms, an alkenyl group or an aryl group, $R^2$ is an alkyl group having from 1 to 5 carbon atoms, and n is an integer of 2 to 3, an alcohol (C) having formula (3)

$$R^3CH_2OH \quad (3)$$

wherein $R^3$ is a hydrogen atom, or an unsubstituted or substituted alkyl group having from 1 to 12 carbon atoms, and oxalic acid (D), in such ratios that the amount of alcohol (C) ranges from 0.5 to 100 mols per mol of all alkoxy groups present in the silicon compounds (A) and (B), and the amount of oxalic acid (D) ranges from 0.2 to 2 mols per mol of all alkoxy groups in the silicon compounds (A) and (B), and while maintaining the mixture at a $SiO_2$ concentration ranging from 0.5 to 11%, as calculated from silicon atoms in the mixture, by means of the alcohol (C);

heating the reaction mixture at a temperature ranging from 50 to 180° C. until the total remaining amount of the silicon compounds (A) and (B) in the reaction mixture is not more than 5 mol %.

6. The process according to claim 5, wherein silicon compound (A) is tetramethoxysilane, tetraethoxysilane, tetrapropoxysilane or tetrabutoxysilane.

7. The process according to claim 5, wherein, in the case where n in formula (2) is 2, silicon compound (B) is dimethyldimethoxysilane, diethyldimethoxysilane, dipropyldimethoxysilane, dibuthyldimethoxysilane, diphenyldimethoxysilane, divinyldimethoxysilane, dimethyldimethoxysilane, diphenyldimethoxysilane, dipropyldimethoxysilane, dibutyldiethoxysilane, diphenyldiethoxysilane or divinyldiethoxysilane; and in the case where n in formula (2) is 3, silicon compound (B) is trimethylmethoxysilane, triethylmethoxysilane, tripropylmethoxysilane, tributylmethoxysilane, triphenylmethoxysilane, trivinylmethoxysilane, trimethylethoxysilane, triethylethoxysilane, tripropylethoxysilane, tributylethoxysilane, triphenylethoxysilane or trivinylethoxysilane.

8. The process according to claim 5, wherein the polysiloxane has a number average molecular weight ranging from 2,000 to 8,000.

9. A process for producing a coating fluid, comprising:

forming a reaction mixture comprising a silicon compound (A) having formula (1):

$$Si(OR)_4 \quad (1)$$

wherein R is an alkyl group having from 1 to 5 carbon atoms, and/or a silicon compound (B) having formula (2):

$$R^1{}_n Si(OR^2)_{4-n} \quad (2)$$

wherein $R^1$ is an unsubstituted or substituted alkyl group having from 1 to 5 carbon atoms, an alkenyl group or an aryl group, $R^2$ is an alkyl group having from 1 to 5 carbon atoms, and n is an integer of 2 to 3, an alcohol (C) having formula (3):

$$R^3CH_2OH \quad (3)$$

wherein $R^3$ is a hydrogen atom, or an unsubstituted or substituted alkyl group having from 1 to 12 carbon atoms, and oxalic acid (D), in such ratios that the amount of alcohol (C) ranges from 0.5 to 100 mols per mol of all alkoxy groups present in the silicon compounds (A) and (B), and the amount of oxalic acid (D) ranges from 0.2 to 2 mols per mol of all alkoxy groups in the silicon compounds (A) and (B), and while maintaining the mixture at a $SiO_2$ concentration ranging from 0.5 to 11%, as calculated from silicon atoms in the mixture, by means of the alcohol (C);

heating the reaction mixture at a temperature ranging from 50 to 180° C. until the total remaining amount of the silicon compounds (A) and (B) in the reaction mixture is not more than 5 mol %, thereby forming a solution of a polysiloxane having a number average molecular weight, calculated on the basis of a polystyrene standard, ranging from 2,000 to 15,000.

10. The process according to claim 9, wherein silicon compound (A) is tetramethoxysilane, tetraethoxysilane, tetrapropoxysilane or tetrabutoxysilane.

11. The process according to claim 9, wherein, in the case wherein, n in formula (2) is 1, silicon compound (B) is methyltrimethoxysilane, ethyltrimethoxysilane, propyltrimethoxysilane, butyltrimethoxysilane, phenyltrimethoxysilane, vinyltrimethoxysilane, methyltriethoxysilane, ethyltriethoxysilane, propyltriethoxysilane, butyltriethoxysilane, phenyltriethoxysilane or vinyltriethoxysilane; in the case where n in formula (2) is 2, silicon compound (B) is dimethyldimethoxysilane, diethyldimethoxysilane, dipropyldiethoxysilane, dibutyldiethoxysilane, diphenyldimethoxysilane, divinyldimethoxysilane, dimethyldiethoxysilane, diethyldiethoxysilane, diphenyldiethoxysilane or divinyldiethoxysilane; and in the case where n in formula (2) is 3, silicon compound (B) is trimethylmethoxysilane, triethylmethoxysilane, tripropylmethoxysilane, tributylmethoxysilane, triphenylmethoxysilane, trivinylmethoxysilane, trimethylethoxysilane, triethylethoxysilane, tripropylethoxysilane, tributylethoxysilane, triphenylethoxysilane or trivinylethoxysilane.

12. The process according to claim 9, wherein the polysiloxane has a number average molecular weight ranging from 2,000 to 8,000.

* * * * *